United States Patent Office 3,429,627
Patented Feb. 25, 1969

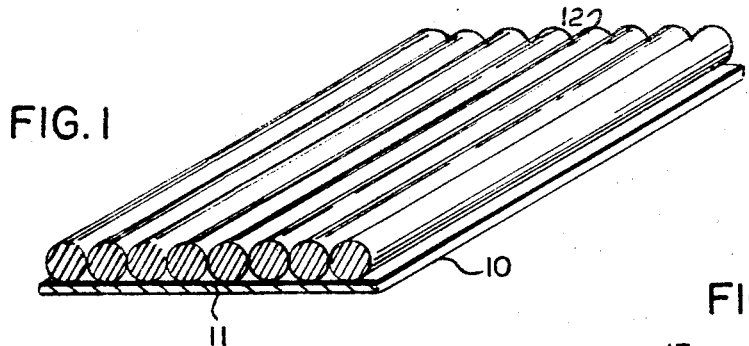
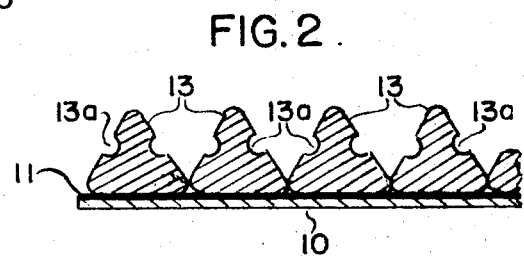
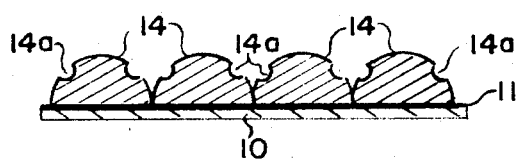
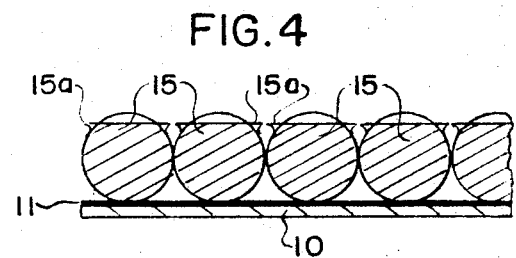
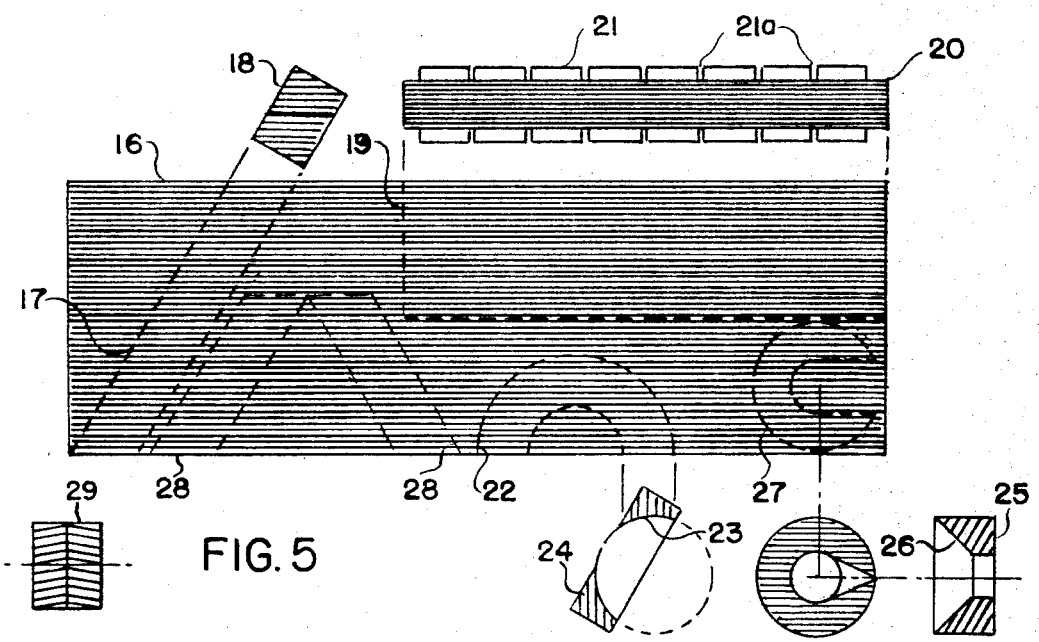

3,429,627
FILAMENTARY FACED BEARING
Richard Freund, 273 Lawton Ave.,
Cliffside Park, N.J. 07010
Filed Dec. 29, 1965, Ser. No. 517,217
U.S. Cl. 308—238     5 Claims
Int. Cl. F16c 27/02, 33/20, 27/06

ABSTRACT OF THE DISCLOSURE

A bearing comprises a rigid backing member having a bearing surface in the form of a surface of revolution and a plurality of coextensive lengths of monofilamentary bearing material such as polytetrafluoroethylene arranged in a single layer around the surface of the bearing member and bonded thereto. All of the exposed surfaces of the lengths of material extend in the same direction and constitute the sole bearing support. The rigid backing member may alternatively be in the form of an annular sleeve or one having segmental spherical, frustoconical, or other desired forms of a surface of revolution.

---

Figure 6A:
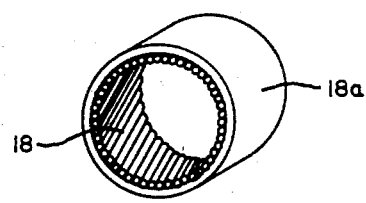

This invention relates to a filamentary faced bearing and a method of fabricating the same and particularly to bearings faced with filaments of plastic material having a relatively low coefficient of friction.

In applicant's prior Patent 3,167,366, there is described and claimed a bearing in which the bearing surface is provided by a series of turns of filamentary material, preferably of a plastic material having a relatively low coefficient of friction. In each of the forms of the invention disclosed in aforesaid patent, one or more turns of the filamentary material are wound on a mandrel, a supporting backing is disposed about the turns, and the assembly then removed from the mandrel.

While bearings of the type described and claimed in aforesaid patent are satisfactory from a performance standpoint, they are somewhat costly to manufacture on a mass-production basis and are somewhat difficult to fabricate in the form of bearings other than cylindrical sleeve bearings, for example spherical, conical, planar (thrust), etc.

It is an object of the present invention therefore to provide a new and improved filamentary faced bearing which obviates one or more of the limitations of the bearing described in aforesaid Patent 3,167,366 and one which is simple and economical to manufacture in quantity.

In accordance with the invention, there is provided a bearing comprising a rigid bearing backing member having a periphery in the form of a surface of revolution, and a plurality of parallel coextensive lengths of monofilamentary bearing material disposed in a single layer around the periphery of the bearing member and bonded thereto, all the exposed surfaces of the lengths of material extending in the same direction and constituting the sole bearing support. The term "bearing" is used herein and in the appended claims to refer not only to load-supporting bearings but also to seals having a similar structure but which support little if any load. The term "essentially axial" is used herein and in the appended claims to include filamentary lengths which extend for only a fraction of a helical turn within the axial limits of the bearing.

For a better understanding of the present invention, together with other and further objects thereof, reference is had to the following description, taken in connection with the accompanying drawings, while its scope will be pointed out in the appended claims.

Referring now to the drawings:

FIG. 1 is a view, in perspective, of a composite sheet including an array of filaments of bearing material suitable for use in fabricating bearings in accordance with the invention;

FIGS. 2, 3, and 4 are cross-sectional views of modified forms of sheet and filament assemblies;

FIG. 5 is a diagrammatic representation of a method of cutting portions from a sheet and filament assembly, such as FIG. 1, for use in bearings of different configurations, while FIG. 6a–6e, inclusive, are detail perspective and/or sectional views of bearings formed from portions of the sheet and filament assembly shown in FIG. 5.

Referring now more particularly to FIG. 1 of the drawings, there is represented an intermediate article of manufacture for use in fabricating bearings of filamentary bearing material comprising a sheet 10 of flexible material having an adhesive coating 11 and a plurality of substantially contiguous and parallel filaments 12 of bearing material adhered to the sheet in a single layer. The sheet 10 may be of an acetate or other plastic material with a pressure-sensitive adhesive coating 11, for example of the type commercially available as "Scotch" tape from the 3M Company. Alternatively, the filaments may be permanently bonded to the flexible sheet for later insertion in or bonding to a rigid backing. Each of the filaments 12 is preferably of a plastic material having a relatively low coefficient of friction, for example nylon or polytetrafluoroethylene commercially available as "Teflon" from E. I. du Pont Company. The dimensions of the elements in FIG. 1 are greatly exaggerated for the sake of clarity. In fact, the filaments 12 will ordinarily have a diameter of from 0.001 to 0.010 inch for bearings under one inch inside diameter.

In FIG. 2 there is shown, in cross-section, a modified form of the sheet and filament assembly of FIG. 1 comprising a series of filaments 13 of approximately triangular cross-section having one face adhering to the coated sheet 10 and with reentrant locking surfaces, such as grooves 13a, in exposed portions of the filaments.

FIG. 3 represents another modified form of the sheet and filament assembly comprising a series of filaments 14 substantially semicircular in cross-section but provided with reentrant locking grooves 14a.

A still further modified form of the sheet and filament assembly is shown in FIG. 4, comprising a series of filaments 15 of essentially circular cross-section but having upset projections or ears 15a. Such projections or ears may be formed on a sheet array of any of the filament cross-sections shown by passing over it transversely a hot coining roller or by pressing into the filament array a hot grid of ridges transverse to the filaments. In all cases, filament bond may be enhanced by roughening the surface of the filament, as by chemical etching.

Referring now to FIG. 5 of the drawings, there is represented schematically a method by which a sheet and filament assembly, such as that of any of FIGS. 1 to 4 inclusive, may be cut into desired shapes for bonding to a backing member to form a filament-faced bearing. In FIG. 5, from a sheet and filament assembly 16 may be cut portions representing the planar developments of desired bearing surfaces. For a planar bearing such as a flat thrust washer for example, the cut portion is used without deformation. If it is desired to form a single cylindrical bearing surface, the portion may be cut along the dotted lines 17 which, when rolled up for insertion in a bearing backing member, is represented at 18 and is shown in a backing member 18a in FIG. 6a. With this arrangement, it is noted that the filaments are at an angle to the axis of the cylindrical bearing, an arrangement which is advantageous in distributing load over more filaments.

Figure 6B:
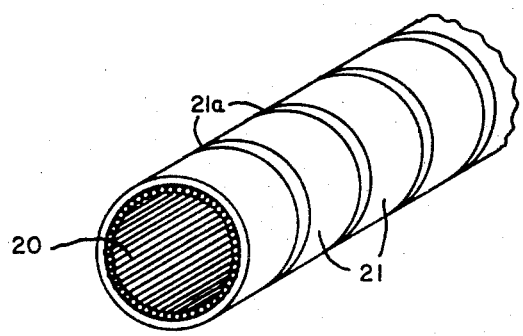

If it is desired to form a plurality of cylindrical bearings at one time, an elongated portion of the sheet and filament assembly 16 may be cut along the lines 19 and rolled into a cylindrical form represented at 20. An annular bearing shell or backing member 21, having a uniformly thick internal coating of uncured bonding material such as an uncured resin, may then be slipped over the tubular element 20 and the assembly cured at a suitable temperature and pressure to bond the filaments to the internal periphery of the bearing shell 21. The required pressure during cure may be supplied, for example, by inserting a closely fitting nylon mandrel within the tubular element 20 which will then expand at the curing temperature appreciably more than the typical restraining metal backing, a function of the relative coefficients of thermal expansion of nylon and metal. The plastic sheet to which the filaments were initially adhered may then be stripped from the filaments or dissolved chemically, leaving the exposed surfaces of the filaments as the supporting surface of the bearing. Either before or after the stripping of the sheet from the filaments, the bearing shell 21, with its bonded filaments, may be cut into desired lengths, as indicated by the cuts 21a, as shown in FIG. 5 and FIG. 6b.

Figure 6C:
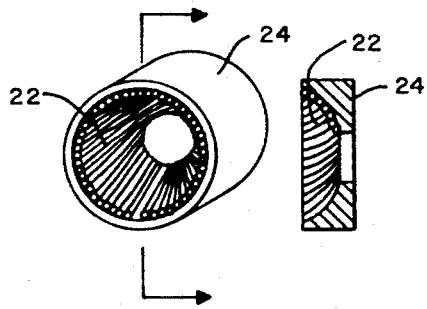

In the event it is desired to form a bearing having a segmental spherical bearing surface, for example the surface 23 of a bearing backing member 24, the sheet 16 may be cut along the lines 22 in the form of a segment of an annulus and this annulus may be pressed to conform to the surface 23 during the step of bonding the filaments to the backing member 24. A perspective view and cross-sectional view of the resulting bearing are shown in FIG. 6c. As before, the temporary adhesive sheet 10 may then be stripped from the filaments.

Figure 6D:
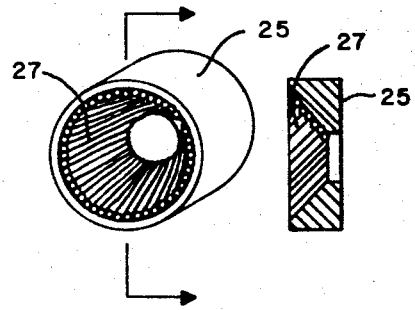
Figure 6E:
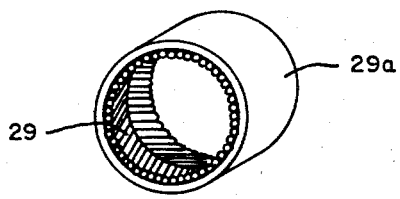

Again, if it is desired to fabricate a bearing in which a backing member 25 has a frusto-conical surface 26, a portion of the sheet and filament assembly 16 may be cut along the lines 27 in the form of a section of an annulus which may then be pressed to conform to the surface 26 during bonding. A perspective view and cross-sectional view of the resulting bearing are shown in FIG. 6d. A herringbone "lay" of the filaments in a finished bearing may be obtained by cutting the sheet 16 along the lines 28, the resultant V-shaped strips then being coiled to the configuration indicated at 29 which, after insertion in a backing member 29a, is shown in FIG. 6e.

In the various forms of the invention described, the filaments are shown as closely spaced or contiguous. In some applications, it may be desirable to have a discrete spacing between adjacent filaments, to aid in the passage of a lubricant. When a lubricant film is present between a shaft and a bearing of the type described, bearing filaments at an angle to the axis tend to scrape off excess lubricant and move it along the filaments to one end of the bearing. Reversing direction of shaft rotation reverses this flow of lubricant. The herringbone filament lay 29 of FIG. 5 combines the functions of bearing and seal by tending to move lubricant from each end toward the middle of the bearing, preventing its loss. By incorporating oil wicks between spaced filaments, lubricant can be stored and redistributed over the full face of the bearing. In a bearing without an oil wick, the worn debris or powder which reduces friction may likewise be conserved by such a herringbone lay.

The filament lay on an adhesive sheet may advantageously comprise filaments of more than one plastic or metal material of varying physical characteristics. For example, a polytetrafluoroethylene filament is most desirable for dry bearings because, as it wears, it forms a low-friction coating or lubricating film on the associated shaft. Nylon filament has higher abrasion resistance so that it wears more slowly. A bearing including a mix of filaments of these two materials may have a longer life than one of either filament alone. Similarly, a mix of oil wick threads with nylon or metal filaments may store and distribute lubricant to maintain a lubricating film.

While, for most applications, bearing filaments in the form of a monofilament of plastic material is preferred, the bearing filaments may be of other ductile materials commonly used for lubricated bearing faces because of their ability to conform with short run-in to a harder shaft. For example, the bearing filament may be of aluminum, silver, or other ductile metal. Likewise, the adhesive strip may be of other material of appropriate flexibility and strength, either plastic or metallic. Similarly, the adhesive may be a temporary pressure-sensitive bond or a permanent resin bond to the backing sheet or strip, which can then be cut to size and formed to the bearing shape.

As stated previously, it is preferred that the lay of the bearing filaments be essentially axial, that is, substantially axial or deviating therefrom by an amount such that any particular filament makes only a fraction of a helical turn within the axial dimension of the bearing. As a result, the individual filaments are relatively short, minimizing relative elongation between the filaments and the backing member and minimizing stresses which might tend to loosen the bond between them.

The material used for bonding the bearing filaments to the bearing backing material may be any material suitable to the physical properties of the filaments and the backing material, for example it may be a soft solder or an epoxy or other thermosetting resin.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:
1. A bearing comprising:
 a rigid bearing backing member having a bearing surface in the form of a surface of revolution;
 and a plurality of parallel coextensive lengths of monofilamentary bearing material disposed in a single layer around the surface of said member and bonded thereto;
 all the exposed surfaces of said lengths of material extending in the same direction and constituting the sole bearing support.
2. A bearing in accordance with claim 1 in which the backing member is an annular sleeve and the monofilamentary lengths extend essentially axially and are disposed around the inner periphery of the member.
3. A bearing in accordance with claim 2 in which each of the monofilamentary lengths is disposed so as to form only a portion of a helical turn.
4. A bearing in accordance with claim 1 in which the backing member has a segmental-spherical surface and the monofilamentary lengths are pressed to conform to such surface.
5. A bearing in accordance with claim 1 in which the backing member has a frusto-conical surface and the monofilamentary lengths are pressed to conform to such surface.

References Cited
UNITED STATES PATENTS

| | | | |
|---|---|---|---|
| 3,110,530 | 11/1963 | Herman | 308—238 |
| 3,328,100 | 6/1967 | Spokes et al. | 308—238 |
| 2,324,083 | 7/1943 | Holmes | 308—238 X |
| 2,807,510 | 9/1957 | Schubert et al. | 308—278 |
| 2,815,252 | 12/1957 | Baker | 308—238 X |
| 2,983,562 | 5/1961 | Runton et al. | 308—238 |
| 3,033,623 | 5/1962 | Thomson | 308—238 |
| 3,167,366 | 1/1965 | Freund | 308—238 |

FREDERICK L. MATTESON, JR., Primary Examiner.

R. A. DUA, Assistant Examiner.